United States Patent [19]

Garner et al.

[11] Patent Number: 4,849,162
[45] Date of Patent: Jul. 18, 1989

[54] MODULAR RADIAL NEUTRON REFLECTOR

[75] Inventors: Daniel C. Garner, Murrysville; Donald G. Sherwood, Monroeville; Albert C. Davidson, Pleasant Hills, all of Pa.

[73] Assignee: Westinghouse Electric Corp., Pittsburgh, Pa.

[21] Appl. No.: 670,732

[22] Filed: Nov. 13, 1984

[51] Int. Cl.⁴ .............................................. G21C 5/00
[52] U.S. Cl. ..................................... 376/458; 376/399; 376/400
[58] Field of Search ............... 376/458, 459, 377, 389, 376/390, 399, 400

[56] References Cited

U.S. PATENT DOCUMENTS

| | | | |
|---|---|---|---|
| 3,260,650 | 7/1966 | Kalk et al. | 376/458 X |
| 3,785,924 | 1/1974 | Notari | 376/400 X |
| 4,462,956 | 7/1984 | Boiron et al. | 376/400 X |
| 4,560,531 | 12/1985 | Leroy | 376/400 X |
| 4,701,299 | 10/1987 | Alibran et al. | 376/302 |
| 4,751,043 | 6/1988 | Freeman et al. | 376/458 X |

FOREIGN PATENT DOCUMENTS 2539244 1/1983 France .

*Primary Examiner*—John E. Maples

[57] ABSTRACT

Modular neutron reflector assemblies removably insertable into the irregular space in a nuclear reactor between a generally cylindrical array of square fuel assemblies comprising the core and the cylindrical core barrel surrounding the core, include an elongated enclosure having a strongback adjacent the core barrel and flat plates adjacent the fuel assemblies. The strongback is thicker than the steel plates by an amount which results in the strongback and plates reaching approximately the same temperature to minimize thermal stresses despite the 8 to 20 times greater nuclear heating at the core side of the enclosure as opposed to that at the core barrel side. The enclosure is suspended by a single point mounting on the core barrel which permits vertical, radial, and circumferential expansion but a pin depending from the lower end of the enclosure slides in a vertical bore in the reactor lower core support plate to limit lateral movement while allowing unrestrained vertical expansion and contraction. A separately removable reflector unit in each enclosure comprises a bundle of closely packed stainless steel circular rods with smaller diameter rods inserted in the interstices between the larger rods to generate a 0.90-0.92% volume fraction of stainless steel while also providing a distributed array of small longitudinal passages for reactor coolant. Selected rods are suspended from a cover plate on the module with the remaining rods suspended from a horizontal plate which is in turn, suspended from the selected rods so that the rods are all free to expand and contract vertically.

34 Claims, 6 Drawing Sheets

MODULAR RADIAL NEUTRON REFLECTOR

BACKGROUND OF THE INVENTION

This invention is directed to neutron reflectors for nuclear reactors and more particularly to modular units which are inserted between the irregular periphery of the reactor core and the cylindrical inner face of the reactor pressure vessel to reflect neutrons back to the peripheral fuel assemblies to thus raise their power output relative to the inner fuel assemblies.

PRIOR ART

The fission reactions in a nuclear reactor generate heat and release neutrons which produce additional fission reactions in the nuclear fuel. The fissile material is massed in the reactor such that the neutron flux density is sufficient to maintain a sustained fission process. In the commercial reactor, pellets of the fissile material are encased in zircalloy rods mounted in modular, elongated fuel assemblies which are generally square in cross-section. A large number of these square, elongated fuel assemblies are massed to form a generally cylindrical reactor core which is housed inside a cylindrical stainless steel core barrel between horizontal upper and lower stainless steel core plates. This entire assembly in turn, is mounted inside a pressure vessel with generally hemispherical upper and lower heads. Reactor coolant, introduced into the pressure vessel through inlet nozzles, flows downward in the annular space between the core barrel and the pressure vessel, reverses direction, flows upward through openings in the lower core plate, and through the fuel assemblies where it is heated as a result of the fission reactions before being directed radially out of the pressure vessel through outlet nozzles. The heat extracted by the reactor coolant from the core is utilized to generate electricity thereby lowering the temperature of the reactor coolant which is recirculated through the reactor.

Since the fuel assemblies are square in cross-section, an irregular space exists between the periphery of the core and the inner surface of the core barrel. The usual practice is to place longitudinally extending flat plates along the outer surfaces of the fuel assemblies to confine the upward coolant flow to the fuel assemblies. These plates are held in place by horizontal, irregularly shaped, former plates bolted to the longitudinal plates and to the core barrel. Holes in the former plates permit limited coolant flow in the generally annular space between the longitudinal plates and the core barrel to provide cooling for these components and to equalize the pressure on both sides of the longitudinal plates.

Although the original purpose of the vertical plates was to channel reactor coolant flow through the fuel assemblies, it has been recognized that to some extent, they also reflect neutrons back toward the peripheral fuel assemblies. However, since these plates are relatively thin, most of the neutrons escaping radially from the core migrate into the large volume of water between the plates which absorbs or thermalizes the neutrons with very little reflection.

It has subsequently been recognized in commonly owned U.S. Pat. No. 4,751,043 that replacement of the water in the space between the core and the core barrel with essentially non-hydrogen containing materials results in much more efficient radial neutron reflection. Specifically, it is suggested that this space can be filled with vertically stacked, generally annular, stainless steel plates cooled by reactor coolant circulated through a few widely spaced vertical bores or a number of elongated metal cans arranged around the periphery of the core. These cans may contain either blocks of zirconia or stainless steel, again with vertical cooling ports, or a number of rods supported at several levels by horizontal plates. These rods are either solid stainless steel or zirconia discs encased in zircalloy. In the latter case, longitudinally sliced circular zircalloy rods fill the spaces along the edges of the can where a full round rod cannot be accommodated.

There are several problems associated with radial neutron reflectors. The basic goal is to maximize the mass of reflective material. However, the large amount of heat present in this area of the reactor makes it necessary to provide cooling to control thermal expansion and to protect the materials. Nuclear calculations on stainless steel reflectors indicate a substantial reduction in fuel costs (2.7% for the Advanced Pressurized Water Reactor) if the region adjacent to the core has a volume ratio of 90% to 92% stainless steel and 8% to 10% water. Radiation creep and the need to provide protection for the reactor internals from seismic disturbances must also be taken into consideration in the design of neutron reflectors. The problem is further compounded by the large radial gradiant in radiation heating which can be as much as twenty times greater in the plates adjacent the fuel assemblies as at the boundary with the core barrel. This uneven distribution of radiation heating combined with the irregular space between the core and core barrel can result in major internal thermal stresses and geometric distortion which could adversely interact with the fuel assemblies. If solid material is used in the construction of the neutron reflector it is very expensive to provide a distributed array of small bores for cooling purposes. On the other hand, if rods are to be massed close enough together to provide the desirable neutron reflection properties, it is difficult to devise a means for supporting them while still providing the desired clearances for thermal expansion and radiation creep. The reflector assembly should also minimize pressure differentials between the coolant flow in the fuel assemblies and that in the reflector.

The primary objective then of the subject invention is to provide a radial neutron reflector structure which meets the steel volume ratio necessary for effective neutron reflection as well as the hydraulic and mechanical requirements, in a fashion which minimizes thermal stresses and thermal distortion.

SUMMARY OF THE INVENTION

The above objective and others are met by the modular neutron reflector assembly of the present invention. Each module includes an elongated metallic enclosure containing a removable reflector unit. As one aspect of the invention, the enclosure includes a strongback which, with the module in place, extends vertically along the inner wall of the core barrel, and a plurality of elongated plates joined along their longitudinal edges to each other and to the strongback to form an elongated chamber for the reflector unit. The strongback serves as the main structural component of the module and is thicker than the plates facing the fuel assemblies by an amount which results in the strongback and plates reaching approximately the same operating temperature despite the very large difference in nuclear heating to which the strongback and plates are exposed. This arrangement minimizes the thermal stresses tending to cause the enclosure to bow.

The modules are suspended from the reactor core barrel by a single point support so that they are free to expand longitudinally, radially, and circumferentially without creating large thermal stresses. A pin slides in a vertical bore to restrict lateral movement of the lower end of the module while permitting free vertical expansion and contraction. The reflector unit is similarly suspended within the enclosure to allow unrestrained vertical movement in response to changes in thermal loading.

As another aspect of the invention, the reflector unit comprises a plurality of closely packed rods each having a cross-section which leaves longitudinally extending interstices between adjacent rods and between the peripheral rods and the walls of the enclosure which serve as passageways for reactor coolant. Preferably, the rods are circular in cross section with smaller diameter rods inserted in the interstices formed by larger, closely packed rods to form four smaller interstices while increasing the volume of stainless steel. Even smaller diameter rods are inserted in the interstices between adjacent rods along the periphery of the rod bundle and the walls of the enclosure for the same purpose. Selected rods are suspended by reduced diameter neck portions from a top cover plate on the module enclosure. The other rods, except the smallest rods along the periphery of the bundle, are suspended by reduced diameter neck portions from a horizontal plate which in turn, is suspended from the shoulders formed by the neck portions on the selected rods. Due to space limitations, the smallest rods along the periphery of the bundle are longitudinally welded to the large rods. This configuration for the reflector unit provides the desired 90 to 92% volume ratio for stainless steel while inexpensively providing widely distributed small passageways throughout the stainless steel mass for the cooling medium.

BRIEF DESCRIPTION OF THE DRAWINGS

A fuller understanding of the invention can be gained from the following description of the preferred embodiments when read in conjunction with the accompanying drawings in which.

DESCRIPTION OF THE PREFERRED EMBODIMENT

Figure 1:
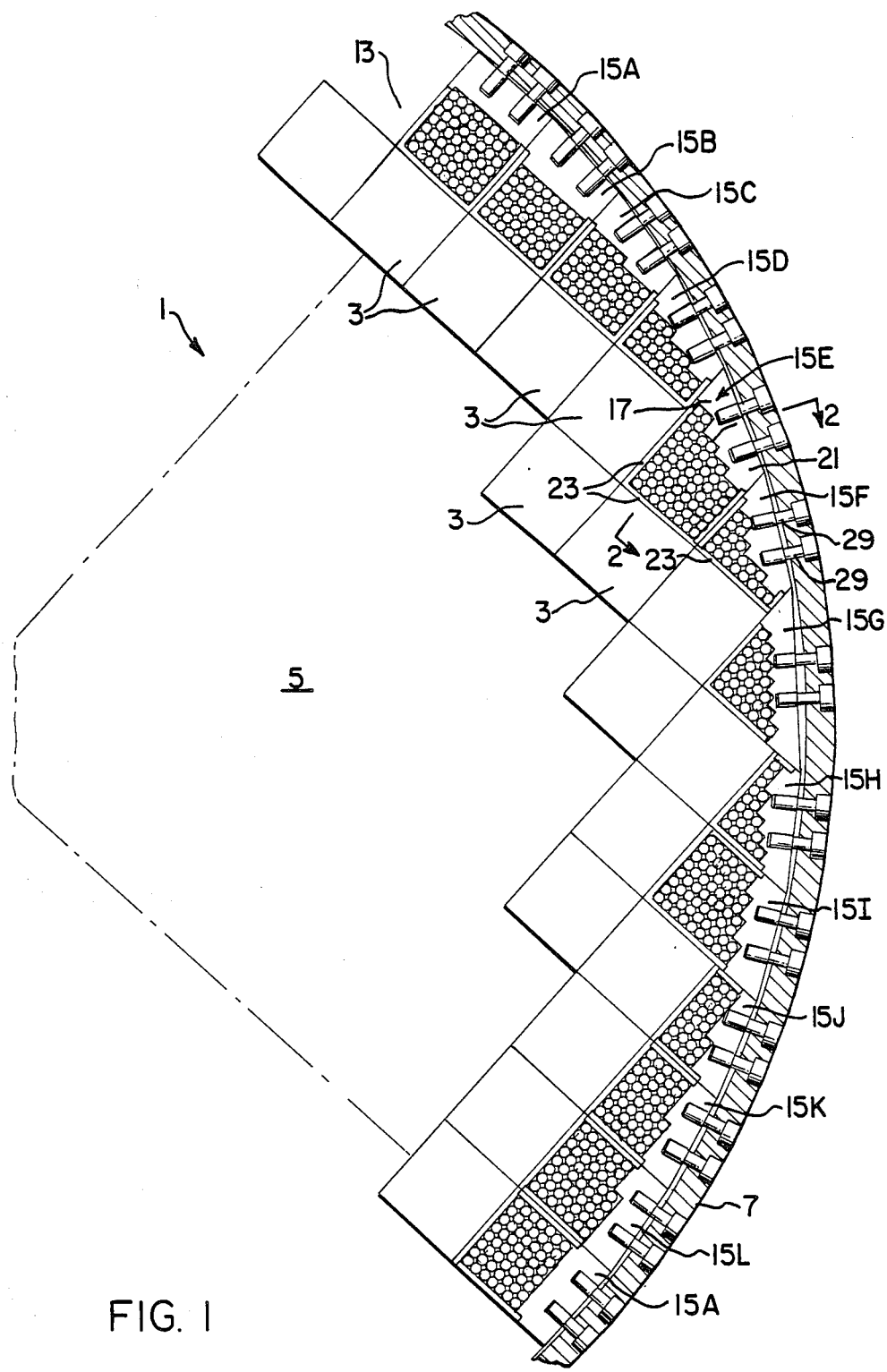
FIG. 1 is a horizontal section through one quadrant of a nuclear reactor to which the invention has been applied.

The present invention will be described as applied to a pressurized water reactor (PWR). Only one quadrant of the core of such a reactor is shown in the horizontal section of FIG. 1 so that a scale could be used which is adequate to reveal the pertinent details. The remaining three quadrants are identical to the quadrant shown. The core 1 of the reactor includes a large number of elongated square fuel assemblies 3 arranged side by side in a generally cylindrical array 5. The construction of the fuel assemblies is conventional and well-known. It is sufficient to say that the fission reactions which occur in the fissile material contained in the fuel assemblies generate heat, which is extracted by reactor coolant circulated upward through the fuel assemblies. The fission reactions also produce neutrons and gamma rays, some of which escape radially from the core. The core is contained within a cylindrical stainless steel core barrel 7 between a lower core plate 9 and an upper core plate 11 (see FIG. 2). The periphery of the array of square fuel assemblies defines, with the inner surface of the cylindrical core barrel, an irregular, generally annular space 13. This space is filled by 48 neutron reflector modules 15. Due to the irregular nature of the space 13, there are 12 different sizes, 15A–15L, of reflector modules. A similar set of reflector modules 15A–15L is provided for each of the four quadrants of the reactor.

While each of the reflector assemblies 15A–15L is unique, there are certain common characteristics which can be appreciated by examination of any one module, for instance module 15E. Each module includes an elongated enclosure 17 and a reflector unit 19, which fits inside the enclosure. The enclosure includes a strongback 21 in the form of a thick slab of stainless steel and several stainless steel plates 23 which are welded at right angles to each other along their longitudinal edges and to the strongback to form an elongated chamber 25 which is closed at the bottom by a lower cover plate 27.

Figure 3:
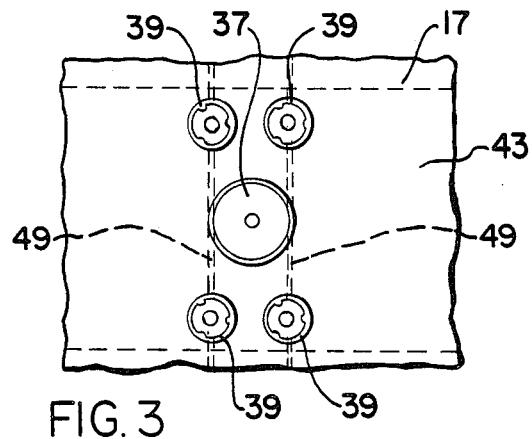
FIG. 3 is a side elevation view of a portion of the reactor of FIG. 1 illustrating the manner in which the neutron reflector modules of the invention are secured at a single point to reactor core barrel.

Each of the modules 15 is secured in the space 13 between the core 1 and the core barrel 7 at one fixed point so that it is free to expand and contract without generating large stresses. In particular, the modules are suspended from near the upper end of the enclosure 17 by four bolts 29 which clamp the strongback 21 to the core barrel 7. A large pin 31 which is inserted in registered bores 33 and 35 in the core barrel and strongback 21 respectively, fixes the position of the module, and being capable of supporting the module's suspended weight, also serves as a redundant support. A cap 37 retains the pin in place. Locking caps 39 or other devices may be used to assure that the proper torque is retained on the bolts 39. While the outer surface 41 of the modules 15 are flat, an arcuate pad 43 extends radially outward to engage a machined portion 45 of the inner wall 47 of the core barrel 7 to provide the contact surface necessary for the bolts 29 to generate the friction force required to secure the module to the core barrel. Vertical grooves 49 in the face of the pad 43 provide passageways for a controlled amount of reactor coolant to flow upward between the module and core barrel and around the bolts 29 for cooling (see FIG. 3).

Additional arcuate pads 51 at vertically spaced locations along the strongback 21 are aligned with additional machined surfaces 53 on the inner wall 47 of the core barrel 7. The tolerances are such that a gap of from 0.010 to 0.040 inches exists between the surfaces 53 and pads 51. This gap permits limited flow of reactor coolant up between the module and the core barrel yet is small enough that the confronting pads and machined surfaces are close enough to restrain lateral movement that might be induced by seismic disturbances.

A pin 55 extending vertically downward from the lower cover plate 27 of the enclosure 17 is slidably received in a bore 57 in the lower core plate 9 to also provide resistance to lateral movement of the module while permitting free vertical movement. Suspension of the module from near its upper end provides a space 59 under the module for expansion and through which reactor coolant which flows upward through bores 61 in the lower core plate 9 and then through the fuel assemblies, may also flow upward through a number of bores 63 in the bottom cover plate 27 of the module into chamber 25. A shoulder 65 on the pin 55 prevents the bottom cover plate 27 from resting flat on the lower core plate 9, which would block coolant flow into the chamber 25 and up the outside of the module, in the remote likelihood that the redundant supports, bolts 29 and pin 31, should fail causing the module to drop.

Figure 4:
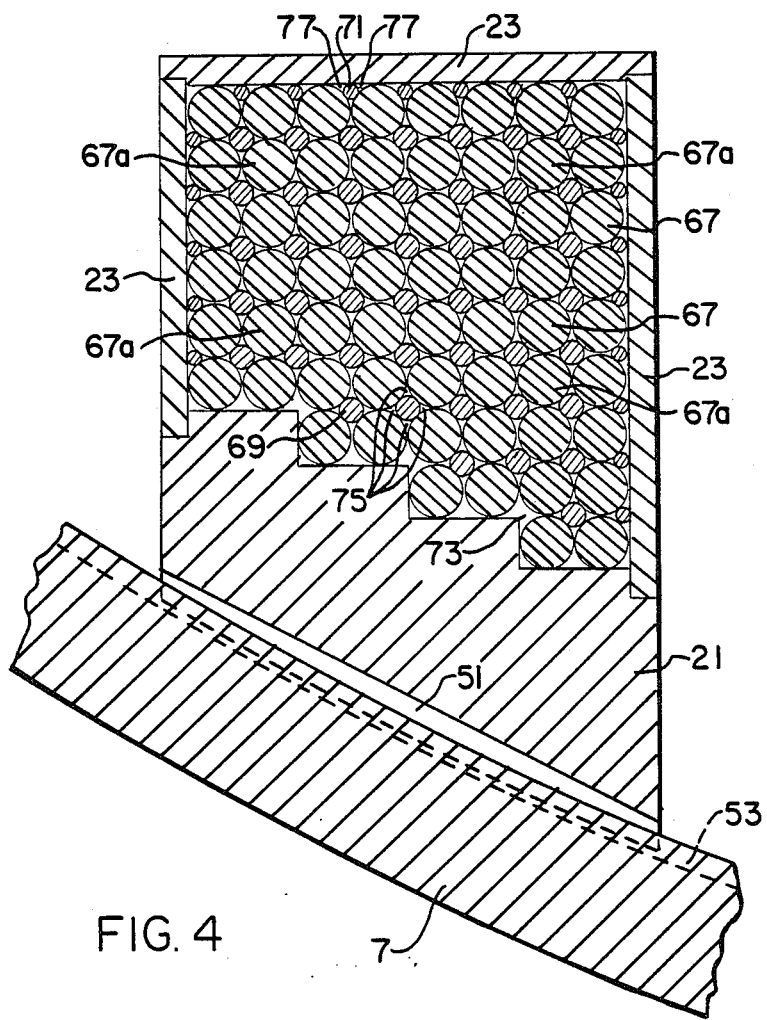
FIG. 4 is a horizontal sectional view through the neutron reflector module of FIG. 2 taken along the line 4—4.
Figure 5:
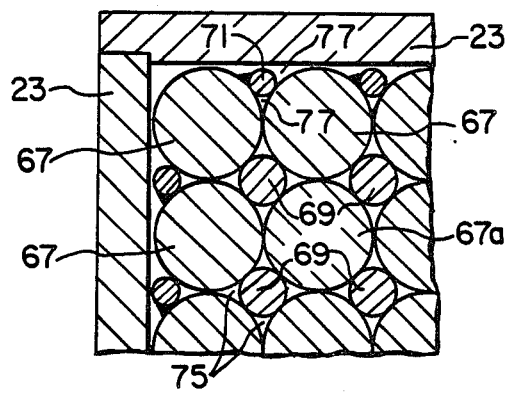
FIG. 5 is an enlarged section of the sectional view of FIG. 4.

Inside the enclosure 17 is a neutron reflector unit 19 comprising a plurality of circular rods of three different diameters 67, 69 and 71. As best seen in FIGS. 4 and 5, the largest diameter rods 67 are packed close together with adjacent rods essentially in contact with each other thereby forming longitudinally extending interstices 73. The second largest diameter rods 69 are inserted in the interstices 73 formed by the juncture of four of the rods 67 and are of such a diameter that they are essentially in contact with each of the four adjacent rods 67 thereby forming smaller longitudinally extending interstices 75. The smallest diameter rods 71 are inserted into the interstices 73 between the large diameter rods 67 and the plates 23 to form smaller interstices 77.

Figure 2:
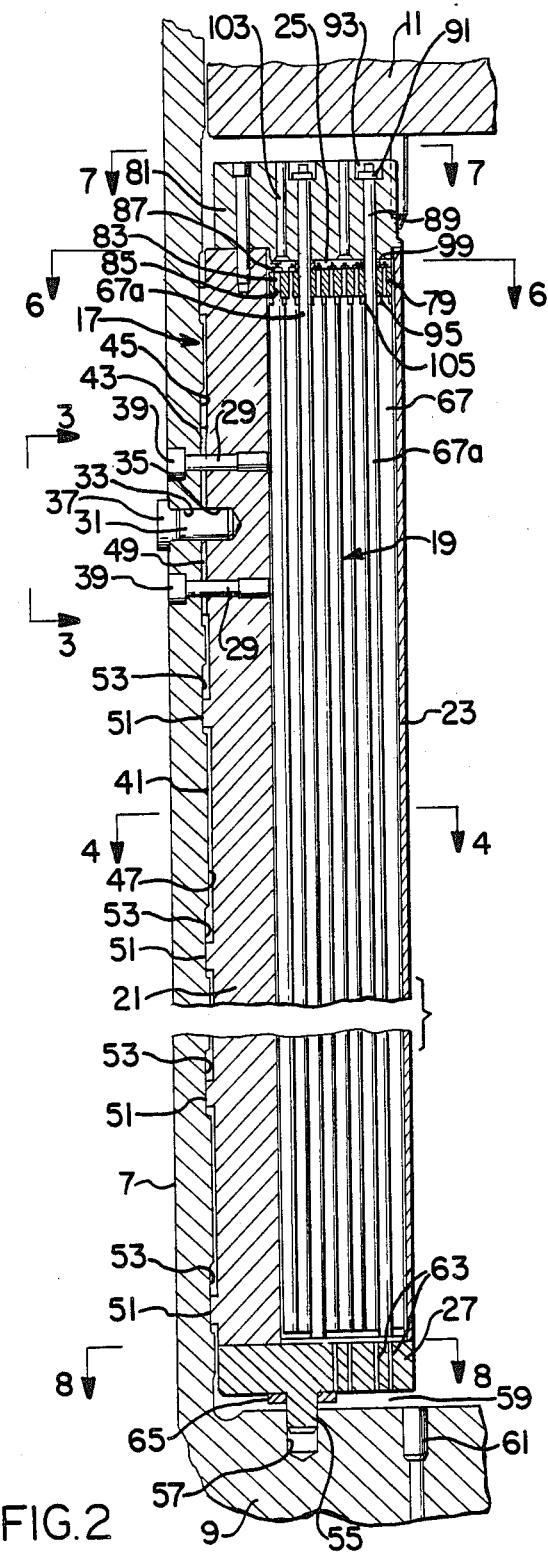
FIG. 2 is a vertical section through a neutron reflector module according to the invention taken generally along the lines 2—2 in FIG. 1.

The rods 67, 69 and 71 are suspended in the chamber 25 by a horizontal plate 79 and a top cover plate 81. As seen in FIG. 2, most of the rods 67 and 69 are provided at the upper end with a reduced diameter neck portion 83 which is retained in a vertical bore 85 in the horizontal plate 79 by a nut 87 threaded onto the end of the neck portion. Certain of the largest diameter rods 67, specifically the four rods 67a, one near each corner of the rod bundle, have extended neck TM -portions 89 which pass upward, not only through the horizontal plate 79, but also the top cover plate 81 where they are retained in the counterbored holes 93 by nuts 91 threaded onto the ends of the extended neck portions The horizontal plate 79, is carried by the shoulders 95 formed by the neck portion 89 on the rods 67a. Since there is little room along the edges for suspending the rods 71 directly from the plate 79, these rods are welded longitudinally to an adjacent rod 67 by a weld 97. Thus, the rods 67a are suspended from the top cover 81, the remaining rods 67 and the rods 69 are suspended from the plate 79 which is suspended from the rods 67a, and the rods 71 are welded to the rods 67. Sleeves 99 on the neck portions 89 of the rods 67a clamp the horizontal plate 79 between the shoulder 95 and the top cover plate 81.

Figure 6:
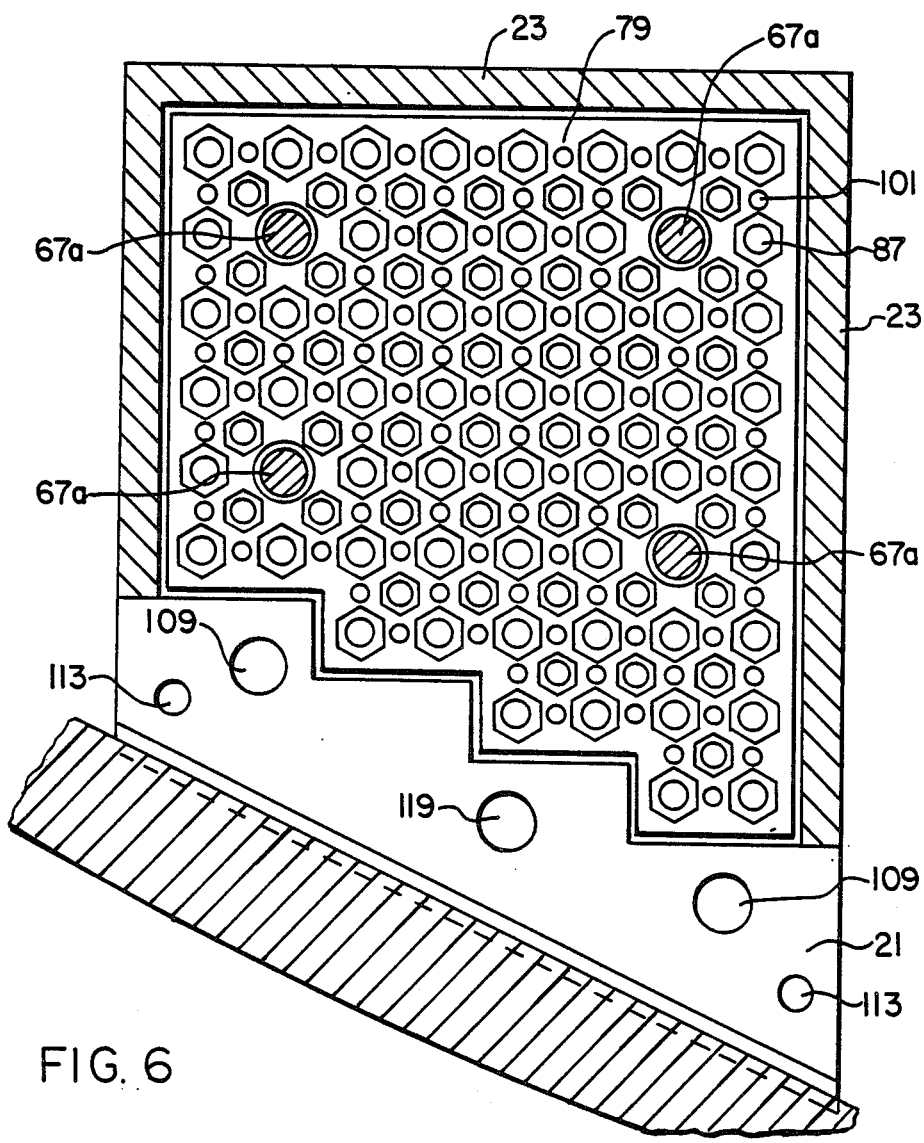
FIG. 6 is a horizontal sectional view through the neutron reflector module shown in FIG. 2 taken along the line 6—6.
Figure 7:
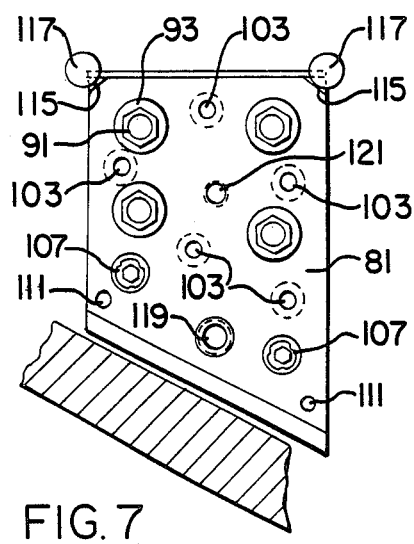
FIG. 7 is a plan view of the neutron reflector module taken along the line 7—7 in FIG. 2.

In order to accommodate reactor coolant flow through the module, the plate 79 and top cover plate 81 are provided with a plurality of vertical bores 101 and 103 respectively (see FIGS. 2, 6 and 7). In addition, the rods 67 are turned down at the portion 105 below the plate 79 so that the passages formed by the interstices 75 and 77 can communicate with the bores 101. Reactor coolant, which is introduced into the space 59 below the modules through the bores 61, passes upward through the bores 63 in the lower cover plate 27, circulates under the rods and then passes up through the passages formed by interstices 75 and 77, flows through the bores 101 in the plate 79, and out of the bores 103 in the top cover plate 81. The closely packed rods present a large mass of metal while at the same time providing the necessary passages for the cooling medium. The cooling passages are uniformly distributed through the mass without the need to drill or otherwise cut a large number of small diameter passages in a solid block of metal. In the example shown, the rods 67 have a diameter of 1.097 inches and are located on a square pitch of 1.100 inches. The bars 69 and 71 are 0.450 and 0.270 inches in diameter respectively These dimensions allow for manufacturing tolerances yet place the rods in essentially longitudinal contact with adjacent rods. Such a configuration of circular rods provides a stainless steel volume fraction of 0.90 to 0.92 within the enclosure, without considering the benefit of the solid stainless steel strongback 21. The increased neutron reflection to the core provided by this configuration results in a reduction of about 2.7% in fuel costs.

Figure 8:
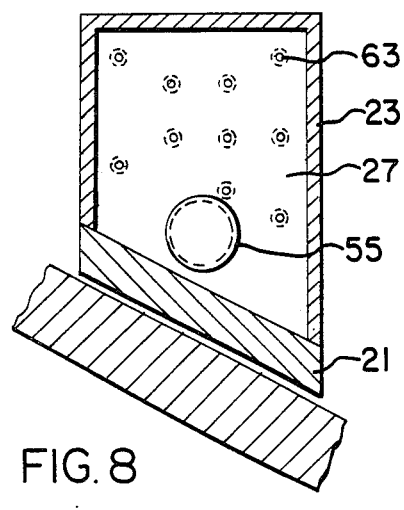
FIG. 8 is a horizontal sectional view of the neutron reflector module of FIG. 2 taken along the line 8—8.

The amount of reactor coolant flowing through the module is regulated by the size and position of the bores 63 in the lower end plate 27 which are shown in FIGS. 2 and 8. They are designed such that the major pressure drop across the modules occurs at the lower end plate 27 with only minimal pressure loss occurring within the enclosure 17. Consequently, differential pressure across the enclosure plates 23 is inward as would be any leakage. It will be noticed as shown in FIG. 2 that the rods 67a are slightly longer than the other rods so that, should the upper suspension system fail and the rod bundle drop, there will still be sufficient space for reactor coolant to circulate under the other rods and reach the passageways formed by the interstices 75 and 77. As mentioned previously, the collar 65 on pin 55 provides similar clearance under the lower cover plate should the entire module drop.

As best seen from FIGS. 6 and 7, the top cover plate 81 is secured to the enclosure 17 by two bolts 107 which are threaded into bores 109 in the top of the strongback 21. Proper alignment of the top cover plate with respect to the strongback is assured by pins 111 which are received in bores 113 in the strongback. Recesses 115 at the inward corners of the top cover plate 81 provide clearance for the fuel assembly locating pins 117 which depend from the upper core plate 11.

The entire module 15 is removable from the reactor by threading an eye-bolt (not shown) into a bore 119 in the top cover plate 81 and the strongback 21, which is vertically aligned with the center of gravity of the enclosure, and lifting the module straight up. Clearances between the modules and the fuel assemblies provide sufficient lateral movement of the modules so that the pads 43 and 51 clear the unmachined portions of the inner surface 47 of the core barrel once the module has been lifted enough so that pin 55 clears bore 57. Similarly, an eye-bolt (not shown) can be threaded into the bore 121 in the top cover plate 81 which is vertically aligned with the center of gravity of the reflector unit 19 so that, after removal of the bolts 107, the reflector unit can be removed from the reactor separately from the enclosure 17.

In addition to the previously mentioned reduction in fuel costs made possible by the invention, there are several other advantages to be gained from use of our neutron reflector modules. Very low thermal stresses are generated in the module. The one point attachment to the core barrel coupled with the guide pin at the lower core support plate allows unrestrained vertical expansion of the modules. Similarly, the one point support for the reflector bars allows unrestrained expansion downward within the enclosure 17. In addition, a gap of about 0.050 inches provided between modules allows unrestrained lateral (circumferential) expansion.

Figure 9:
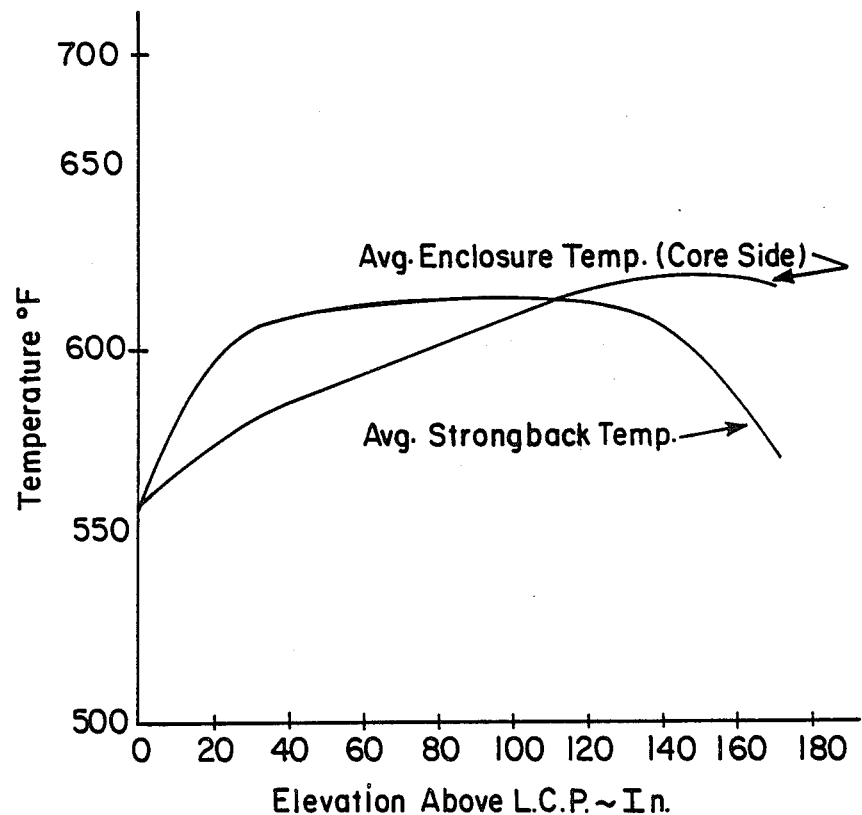
FIG. 9 is a graph plotting the average enclosure temperatures as a function of elevation above the lower core support plate of the reactor.

Thermal stresses are also controlled by limiting temperature differentials between the core side and core barrel side of the modules. Nuclear heating at the core side is 8 to 20 times that at the core barrel side. Compensation is provided by making the strongback at the core barrel side thicker than the plates 23 facing the core so that the temperatures are nearly equal. As may be observed in FIG. 9, which plots the average temperature of the core side of the enclosure 17 and the strongback 21 as a function of height above the lower core plate (L.C.P) 9, the difference in the average (over the height) temperature is in the range of 5° to 10° F.

Figure 10:
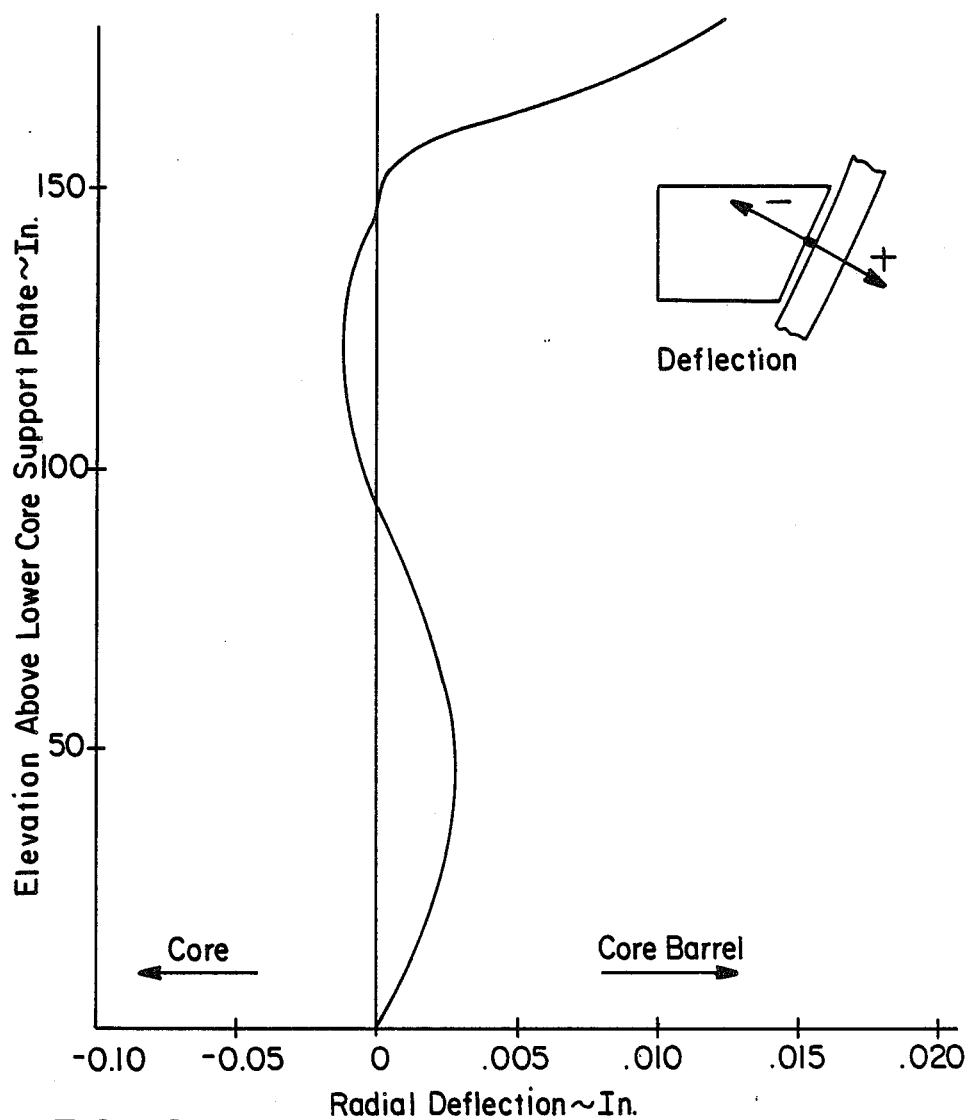
FIG. 10 is a plot of the radial deflection of the neutron reflector module during normal operation due to nuclear heating.

Due to the low core side-to-core barrel side differential temperature, the module distortion is only a few mills, as shown in FIG. 10 which plots radial distortion of the enclosure as a function of height above the lower core support plate 9.

Other advantages of the present invention include the replaceability of the module assemblies. They can be taken out of the reactor with removal of four bolts and one pin per module. Additionally, the rods can be removed for inspection or replacement without removing the lower internals from the reactor vessel. The invention also eliminates all bolts in the high flux region adjacent to the core. The only bolts used are in a low flux region adjacent to the core barrel. Finally, the invention eliminates depressurization loads in the event of a loss of coolant accident (LOCA). Low water volumes and large flow areas at the top of the module prevent significant pressure buildup during a loss of coolant accident.

Figure 11:
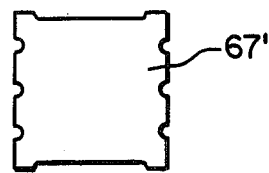
FIGS. 11 and 12 illustrate alternative configurations for the rods used in the neutron reflector modules according to the invention.
Figure 12:
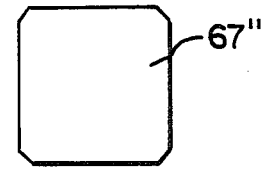

While specific embodiments of the invention have been described in detail, it will be appreciated by those skilled in the art that various modifications and alternatives to those details could be developed in light of the overall teachings of the disclosure. For instance, the rods need not be circular in cross-section, but could be for example rectangular with one or more grooves along the sides or with chamfered corners, as shown in FIGS. 11 and 12 respectively, forming the passages for the reactor coolant. Accordingly, the particular arrangements disclosed are meant to be illustrative only and not limiting as to the scope of the invention which is to be given the full breadth of the appended claims and any and all equivalents thereof.

What is claimed is:

1. A neutron reflector assembly for the irregular space in a nuclear reactor between an array of rectilinear elongated fuel assemblies through which reactor coolant is circulated and a cylindrical core barrel surrounding the array, said neutron reflector assembly comprising:
    a plurality of modules each comprising a metallic mass and configured to collectively substantially fill said irregular space between the fuel assemblies and the core barrel; and
    mounting means separately supporting substantially the full weight of each module from the core barrel at only one point located near the upper end of each module, said modules being sized so that they are free to thermally expand in all directions from said mounting means.

2. The neutron reflector assembly of claim 1, wherein said modules are elongated and extend substantially the full length of said irregular space between the fuel assemblies and the core barrel and wherein said modules are suspended by said mounting means from the core barrel near the upper end of said module.

3. The neutron reflector assembly of claim 2, wherein in said modules each include an elongated metallic enclosure and a metallic reflector unit mounted inside said enclosure.

4. A neutron reflector assembly for the irregular space in a nuclear reactor between an array of rectilinear, elongated fuel assemblies through which reactor coolant is circulated and a cylindrical core barrel surrounding the array, said neutron reflector assembly comprising:
    a plurality of modular elongated enclosures removably insertable into the irregular space between the fuel assembly array and the cylindrical core barrel to substantially fill said space, said enclosures having inner walls defining an elongated camber; and
    a reflector unit for each enclosure comprising a plurality of elongated metallic rods and means for suspending said rods from near their upper end in said elongated chamber such that said rods are free to expand longitudinally to accommodate for thermal expansion and radiation creep, wherein said means is substantially the only support for the weight of said rods in said reflector unit, said rods being arranged to provide longitudinal passages therebetween through which reactor coolant can pass to cool said rods and enclosures.

5. The neutron reflector assembly of claim 4 wherein said rods are packed close together to fill said elongated chamber with adjacent rods in contact with each other and with said inner walls of the enclosure, but with the cross-section of said rods being such as to form longitudinally extending interstices between said rods and between said rods and the inner walls of the enclosure which serve as said longitudinal passages.

6. The neutron reflector assembly of claim 5 wherein the upper end of each rod terminates in a neck portion smaller in cross-section than the remainder of said rod and wherein the means for suspending said rods includes a horizontal plate which defines first vertical apertures in which said neck portion of each rod is secured and defining second vertical apertures in communication with said interstices between the rods through which reactor coolant passes, and means for supporting said horizontal plate near the top of said elongated chamber.

7. The neutron reflector assembly of claim 6 wherein said enclosure includes a top cover plate and wherein said means for supporting said horizontal plate includes extended neck portions on selected of said rods which extend upward and are secured to said top cover plate.

8. The neutron reflector assembly of claim 7 wherein said top cover plate defines apertures through which reactor coolant may pass.

9. The neutron reflector assembly of claim 7 including a bottom cover plate on said enclosures which defines apertures through which reactor coolant enters said enclosure and passes upward through said longitudinally extending interstices, said rods being suspended above said bottom cover plate with said selected rods being longer than the remaining rods and not vertically aligned with said bottom end plate apertures such that should said means for suspending said rods fail and said rods drop down inside the enclosure said selected rods will contact the bottom cover plate and support the remaining rods above the bottom cover plate so that reactor coolant can still flow through said bottom cover plate apertures into said longitudinal interstices.

10. The neutron reflector assembly of claim 6 in which said rods are circular in cross-section.

11. The neutron reflector assembly of claim 10 in which said circular rods include first rods of a first diameter which are packed together with adjacent first rods in longitudinal contact with one another to form first longitudinal interstices, and second rods smaller in diameter than the first rods suspended in said first interstices in longitudinal contact with all of the adjacent first rods defining said first interstices to divide said first interstices into four smaller interstices.

12. The neutron reflector assembly of claim 11 wherein said first rods form border interstices with the inner walls of the elongated enclosure and wherein said rods include third rods, smaller in diameter than the first and second rods, inserted in said border interstices in longitudinal contact with the adjacent first rods and inner enclosure wall to divide said border interstices into three smaller interstices.

13. A neutron reflector assembly for the irregular space in a nuclear reactor between an array of elongated rectilinear, fuel assemblies through which reactor coolant is circulated and a cylindrical core barrel surrounding the array, said neutron reflector assembly comprising:
a plurality of modules each including an elongated strongback and a plurality of elongated plates joined along their longitudinal edges to form an elongated enclosure, said enclosures being removably insertable into the irregular space between the fuel assembly array and the cylindrical core barrel to substantially fill said space, with the strongbacks of each enclosure facing the inner surface of the core barrel and with at least some of said plates in parallel, confronting relation with longitudinal surfaces of the fuel assemblies on the periphery of said array;
a reflector unit mounted inside each enclosure, and including metallic means for reflecting neutrons which escape radially from the fuel assemblies, said metallic means defining longitudinal passages through which reactor coolant can pass to cool the unit and enclosure; and
a one point mounting means for suspending each enclosure from the core barrel at said one point only near end of the strongback for free vertical, radial and circumferential expansion.

14. The neutron reflector assembly of claim 13 including a lower, horizontally extending core plate on the lower end of the core barrel upon which said array of fuel assemblies is supported and including cooperative guide members associated with the lower end of the elongated enclosure of each module and the lower core plate for restricting lateral movement of the lower end of the enclosure while permitting unrestricted vertical movement thereof.

15. The neutron reflector assembly of claim 14 wherein one of said cooperative guide members is a vertically extending pin and the other defines a vertical bore in which said vertically extending pin is inserted.

16. A neutron reflector assembly for the irregular space in a nuclear reactor between an array of elongated rectilinear, fuel assemblies through which reactor coolant is circulated and a cylindrical core barrel surrounding the array, said neutron reflector assembly comprising:
a plurality of modules each including an elongated strongback and a plurality of elongated plates joined along their longitudinal edges to form an elongated enclosure, said enclosures being removably insertable into the irregular space between the fuel assembly array and the cylindrical core barrel to substantially fill said space, with the strongbacks of each enclosure facing the inner surface of the core barrel and with at least some of said plates in parallel, confronting relation with longitudinal surfaces of the fuel assemblies on the periphery of said array; and
a reflector unit mounted inside each enclosure, and including metallic means for reflecting neutrons which escape radially from the fuel assemblies, said metallic means defining longitudinal passages through which reactor coolant can pass to cool the unit and enclosure;
said strongback and plates also being metallic with the relative thickness of said plates and strongback being such that the strongback which is exposed to less heat is thicker by an amount which results in it reaching approximately the same temperature as the plates whereby stresses tending to cause bowing of the enclosures are minimized.

17. The neutron reflector assembly of claim 16 wherein the relative thicknesses of the strongbacks and the elongated plates confronting the fuel assemblies is such that the average temperature difference between the strongbacks and said plates over their height is less than about 10°F.

18. The neutron reflector assembly of claim 16 including a lower, horizontally extending core plate on the lower end of the core barrel upon which said array of fuel assemblies is supported and module support means connected near the upper end of each enclosure for suspending the module in said irregular space between the array of fuel assemblies and the core barrel with a clearance between the bottom of the module and the lower core plate to allow for thermal expansion and radiation creep of the module.

19. The neutron reflector assembly of claim 18 wherein said module support means includes single point means for securing the upper portion of the elongated enclosure of each module to the core barrel and including cooperative guide members associated with the lower end of the elongated enclosure of each module and the lower core plate for restricting lateral movement of the lower end of each elongated enclosure while permitting unrestricted vertical movement thereof.

20. The neutron reflector assembly of claim 19 wherein the single point support means for each module comprises a pin and registered horizontal bores, defined by the strongback of the module enclosure and by the core barrel, in which said pin is inserted to fix the position of the module and serve as a redundant support for the suspended weight of the module, and wherein the single point support means for each module further includes fastener means adjacent to said pin clamping the module to the core barrel.

21. The neutron reflector assembly of claim 20 wherein one of said cooperative guide members is a vertically extending pin and the other defines a vertical bore in which said vertically extending pin is inserted.

22. The neutron reflector assembly of claim 21 wherein the lower end of the elongated enclosure of each module includes a lower horizontal cover plate enclosing the bottom of the module, said lower cover plate defining vertical apertures extending upward from the bottom surface of the lower cover plate through which reactor coolant enters the enclosure for upward passage therethrough, and including means for preventing said cover plate from seating on the lower core plate and blocking said vertical apertures should the module support means by which the module is suspended fail.

23. The neutron reflector assembly of claim 22 wherein said means for preventing a module from seating on the lower core plate comprises a shoulder on said vertically extending pin which is larger in diameter than said vertically extending bore.

24. The neutron reflector assembly of claim 22 wherein said reflector unit comprises a plurality of metallic rods, and rod support means suspending said rods from their upper ends within said enclosure.

25. The neutron reflector assembly of claim 24 wherein said rod support means includes a top cover plate on said enclosure, means for suspending selected rods from said top cover plate and means for suspending the remaining rods from said selected rods.

26. The neutron reflector assembly of claim 25 wherein said selected rods are suspended from the top cover plate by end portions of reduced diameter and wherein said means for supporting the remaining rods includes a horizontal plate having first bores which slide over the reduced diameter portions of the selected rods but not the full diameter portions and having second bores through which said remaining rods are suspended from said plate.

27. The neutron reflector assembly of claim 26 in which said rods are closely packed in said enclosure in contact with the adjacent rods, said rods being of a cross-section which defines longitudinally extending interstices between the rods through which reactor coolant entering the enclosure through said vertical apertures in the lower cover plate can flow upwardly around said rods, said horizontal plate having third bores and the op cover plate having apertures through which the upwardly flowing reactor coolant can pass.

28. The neutron reflector assembly of claim 24, in which said rods include first circular rods of a first diameter which are in longitudinal contact with adjacent first rods to form first interstices and second circular rods of smaller diameter suspended in said first interstices in contact with each of the first rods defining said first interstice and thereby forming four smaller interstices through which reactor coolant may flow.

29. The neutron reflector assembly of claim 20 wherein the outer surface of each strongback which faces the inner surface of the cylindrical core barrel is flat and includes an arcuate pad projecting radially outward from the flat outer surface of the strongback and having a curvature which matches that of the inner surface of the cylindrical core barrel.

30. The neutron reflector assembly of claim 29 in which the radial face of said pad and the confronting surface of said core barrel are machined to provide gap of preselected radial width to control the flow of reactor coolant between the strongback and core barrel while also providing radial support for resisting seismic disturbances.

31. The neutron reflector assembly of claim 30 wherein said radial gap is about 0.010 to about 0.040 inches wide.

32. The neutron reflector assembly of claim 30 including a plurality of vertically spaced arcuate pads on each strongback and correspondingly spaced machined surfaces on the inner surface of said core barrel.

33. The neutron reflector assembly of claim 29 wherein said plates forming said elongated enclosure are joined along their longitudinal edges at right angles to one another and at other than a 90° angle to the flat outer surface of said strongback, and wherein the inner surface of said strongback is longitudinally stepped to form elongated surfaces which are parallel to the opposed surfaces of the elongated plates.

34. The neutron reflector assembly of claim 33 wherein said reflector unit comprises a plurality of tightly packed circular rods which contact each other and the parallel inner surfaces of the elongated plates and stepped surfaces of the strongback with the interstices between the rods and between the rods and said inner surfaces of said plates and the stepped surfaces of said strongback forming said longitudinal passages through which said reactor coolant passes.

* * * * *